United States Patent
Chen et al.

(10) Patent No.: US 10,309,021 B2
(45) Date of Patent: Jun. 4, 2019

(54) METHOD FOR PREPARING AN ELECTROLYTE AND AN ELECTROLYTE REPLENISHMENT SYSTEM DURING ALUMINUM ELECTROLYSIS PROCESS

(71) Applicant: SHENZHEN SUNXING LIGHT ALLOYS MATERIALS CO., LTD, Shenzhen, Guangdong (CN)

(72) Inventors: Xuemin Chen, Guangdong (CN); Jun Yang, Guangdong (CN); Zhihong Li, Guangdong (CN); Weiping Wu, Guangdong (CN); Shiming Wei, Guangdong (CN)

(73) Assignee: SHENZHEN SUNXING LIGHT ALLOYS MATERIALS CO., LTD., Shenzhen, Guangdong (CN)

( * ) Notice: Subject to any disclaimer, the term of this patent is extended or adjusted under 35 U.S.C. 154(b) by 254 days.

(21) Appl. No.: 14/413,473

(22) PCT Filed: Nov. 21, 2012

(86) PCT No.: PCT/CN2012/084993
§ 371 (c)(1),
(2) Date: Jan. 8, 2015

(87) PCT Pub. No.: WO2014/015590
PCT Pub. Date: Jan. 30, 2014

(65) Prior Publication Data
US 2015/0203978 A1    Jul. 23, 2015

(30) Foreign Application Priority Data
Jul. 25, 2012   (CN) .......................... 2012 1 0259099

(51) Int. Cl.
*C25C 3/18*    (2006.01)
*C01F 7/54*    (2006.01)

(52) U.S. Cl.
CPC . *C25C 3/18* (2013.01); *C01F 7/54* (2013.01)

(58) Field of Classification Search
CPC ....... C25C 3/06–3/24; C25C 3/18; C01F 7/54
See application file for complete search history.

(56) References Cited

U.S. PATENT DOCUMENTS

| 2,785,971 | A | * | 3/1957 | Kamlet | C22B 34/1277 420/418 |
|---|---|---|---|---|---|
| 6,258,247 | B1 | * | 7/2001 | Brown | C25C 3/18 205/233 |
| 2009/0166215 | A1 | * | 7/2009 | Beck | C25C 3/06 205/384 |
| 2013/0095021 | A1 | * | 4/2013 | Chen | C01B 35/04 423/297 |

FOREIGN PATENT DOCUMENTS

| CN | 102212724 A | * | 10/2011 | ............. C25C 21/00 |
|---|---|---|---|---|
| CN | 102583422 A | * | 7/2012 | ............. C01B 35/04 |

* cited by examiner

*Primary Examiner* — Ciel P Thomas
(74) *Attorney, Agent, or Firm* — Jackson IPG PLLC; Demian K. Jackson

(57) ABSTRACT

The disclosure provides a method for preparing an electrolyte and an electrolyte replenishment system during an electrolytic process. The method includes the following steps: Step A: placing aluminum in a reactor, vacuumizing the reactor and feeding an inert gas, heating the reactor to 700-850 degrees centigrade, and adding one or more of potassium fluozirconate, potassium fluoborate, sodium hexafluorozirconate and sodium fluoroborate; and Step B: stirring the reactants for 4-6 hours and extracting the upper molten liquid to obtain an electrolyte replenishment system during an aluminum electrolysis process. The disclosure has the following beneficial effects: when used in the aluminum electrolysis industry, the electrolyte system provided herein can be directly used as an aluminum electrolyte or a replenishment system in an electrolyte without changing existing electrolysis technology to significantly reduce an electrolysis temperature during an aluminum electrolysis process.

4 Claims, No Drawings

METHOD FOR PREPARING AN ELECTROLYTE AND AN ELECTROLYTE REPLENISHMENT SYSTEM DURING ALUMINUM ELECTROLYSIS PROCESS

FIELD OF THE INVENTION

The disclosure relates to a method for preparing an electrolyte system and more particularly to a method for preparing an electrolyte and an electrolyte replenishment system during an aluminum electrolysis process.

BACKGROUND OF THE INVENTION

Currently, the aluminum electrolysis industry still employs the conventional Hall-Heroult method in which electrolyte always bases on a fundamental system of cryolite-alumina, cryolite generally referring to trisodium hexafluoroaluminate. As trisodium hexafluoroaluminate and alumina are continuously consumed as an aluminum electrolysis process goes on, electrolyte and alumina need to be separately replenished into the fundamental system of electrolyte so as to keep the aluminum electrolysis process continued. Existing electrolyte replenishment system which mainly includes aluminum fluoride and trisodium hexafluoroaluminate consumes much energy as the electrolysis temperature needs to be kept at about 960 degrees centigrade during the whole aluminum electrolysis process for the sake of the high liquidus temperature of an electrolyte and the necessity of keeping a degree of superheat of a certain temperature to keep alumina dissolved relatively well.

Typically, cryolite is industrially prepared using a synthesis method of: reacting anhydrous hydrofluoric acid with aluminum hydroxide to generate fluoaluminic acid, sequentially reacting fluoaluminic acid with sodium hydroxide or potassium hydroxide at a high temperature and filtering, drying, melting and crushing the obtained substances to obtain cryolite; having a molecular ratio m of 3.0, the cryolite synthesized using this method is relatively high in melting point. The molecular ratio m of the cryolite prepared using existing industrial synthesis methods ranges from 2.0 and 3.0, thus, it is difficult to obtain a relatively pure cryolite of low molecular ratio the molecular ratio m of which is 1.0-1.5.

Thus, existing technologies have defects of high energy consumption for electrolysis and dissatisfactory electrolyte and electrolyte replenishment system.

SUMMARY OF THE INVENTION

To address the technical problem in existing technologies, the inventor, after making a lot of research on electrolyte systems and electrolyte replenishment system selection and preparation methods, unexpectedly finds that by replacing existing electrolytes with an electrolyte containing a cryolite of low molecular ratio for aluminum electrolysis, the electrolysis temperature during an aluminum electrolysis process can be obviously reduced without changing existing electrolysis technologies, thereby reducing power consumption, the volatilization loss of fluoride and the overall production cost.

The disclosure provides a method for preparing an electrolyte and an electrolyte replenishment system during an aluminum electrolysis process, including the following steps:

Step A: placing aluminum in a reactor, vacuumizing the reactor and feeding an inert gas, heating the reactor to 700-850 degrees centigrade, and adding one or more of potassium fluozirconate, potassium fluoborate, sodium hexafluorozirconate and sodium fluoroborate; and Step B: stirring the reactants for 4-6 hours and extracting the upper molten liquid to obtain an electrolyte during an aluminum electrolysis process.

Preferably, the method includes the following steps:

Step A: placing aluminum in a reactor, vacuumizing the reactor and feeding an inert gas, heating the reactor to 700-850 degrees centigrade, and adding potassium fluozirconate; and Step B: stirring the reactants for 4-6 hours and extracting the upper molten liquid to obtain an electrolyte

during an aluminum electrolysis process.

The chemical equation involved in the method is as follows:

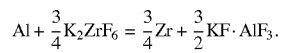

Preferably, the method includes the following steps:

Step A: placing aluminum in a reactor, vacuumizing the reactor and feeding an inert gas, heating the reactor to 700-850 degrees centigrade, and adding sodium hexafluorozirconate; and Step B: stirring the reactants for 4-6 hours and extracting the upper molten liquid to obtain an electrolyte

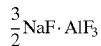

during an aluminum electrolysis process.

The chemical equation involved in the method is as follows:

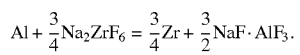

Preferably, the method includes the following steps:

Step A: placing aluminum in a reactor, vacuumizing the reactor and feeding an inert gas, heating the reactor to 700-850 degrees centigrade, and adding a mixture consisting of sodium fluoroborate and sodium hexafluorozirconate in a molar ratio of 2:1; and Step B: stirring the reactants for 4-6 hours and extracting the upper molten liquid to obtain an electrolyte

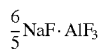

during an aluminum electrolysis process.

The chemical equation involved in the method is as follows:

$$\frac{10}{3}\text{Al} + \text{Na}_2\text{ZrF}_6 + 2\text{NaBF}_4 = \text{ZrB}_2 + \frac{10}{3}\left(\frac{6}{5}\text{NaF}\cdot\text{AlF}_3\right).$$

Preferably, the method includes the following steps:

Step A: placing aluminum in a reactor, vacuumizing the reactor and feeding an inert gas, heating the reactor to 700-850 degrees centigrade, and adding a mixture consisting of potassium fluoborate and potassium fluozirconate in a molar ratio of 2:1; and Step B: stirring the reactants for 4-6 hours and extracting the upper molten liquid to obtain an electrolyte $$\frac{6}{5}\text{KF}\cdot\text{AlF}_3$$

during an aluminum electrolysis process.

The chemical equation involved in the method is as follows $$\frac{10}{3}\text{Al} + \text{K}_2\text{ZrF}_6 + 2\text{KBF}_4 = \text{ZrB}_2 + \frac{10}{3}\left(\frac{6}{5}\text{KF}\cdot\text{AlF}_3\right).$$

Preferably, the method includes the following steps:

Step A: placing aluminum in a reactor, vacuumizing the reactor and feeding an inert gas, heating the reactor to 700-850 degrees centigrade, and adding a mixture consisting of sodium fluoroborate and sodium hexafluorozirconate in a molar ratio of y:x; and Step B: stirring the reactants for 4-6 hours and extracting the upper molten liquid to obtain an electrolyte replenishment system $$\frac{3y+6x}{3y+4x}\text{NaF}\cdot\text{AlF}_3$$

during an aluminum electrolysis process,
wherein the aluminum is added in an excessive amount.

The chemical equation involved in the method is as follows:

$$\text{Al(excessive)} + x\text{Na}_2\text{ZrF}_6 + y\text{NaBF}_4 \rightarrow$$
$$\text{Al}\cdot\text{Zr}\cdot\text{B(alloy)} + \frac{3y+6x}{3y+4x}\text{NaF}\cdot\text{AlF}_3.$$

Preferably, the method includes the following steps:

Step A: placing aluminum in a reactor, vacuumizing the reactor and feeding an inert gas, heating the reactor to 700-850 degrees centigrade, and adding a mixture consisting of potassium fluoborate and potassium fluozirconate in a molar ratio of y:x; and Step B: stirring the reactants for 4-6 hours and extracting the upper molten liquid to obtain an electrolyte replenishment system $$\frac{3y+6x}{3y+4x}\text{KF}\cdot\text{AlF}_3$$

during an aluminum electrolysis process,
wherein the aluminum is added in an excessive amount.

The chemical equation involved in the method is as follows:

$$\text{Al(excessive)} + x\text{K}_2\text{ZrF}_6 + y\text{KBF}_4 \rightarrow \text{Al}\cdot\text{Zr}\cdot\text{B(alloy)} + \frac{3y+6x}{3y+4x}\text{KF}\cdot\text{AlF}_3.$$

The disclosure provides a method of directly mixing a sodium cryolite with a potassium cryolite and using the mixture as an electrolyte or an electrolyte replenishment system, including the following steps:

Step A: placing aluminum in a reactor, vacuumizing the reactor and feeding an inert gas, heating the reactor to 700-850 degrees centigrade, adding potassium fluozirconate, potassium fluoborate or the mixture thereof, stirring the reactants for 4-6 hours and extracting the upper molten liquid to obtain a potassium cryolite; and placing aluminum in another reactor, vacuumizing the reactor and feeding an inert gas, heating the reactor to 700-850 degrees centigrade, adding sodium hexafluorozirconate, sodium fluoborate or the mixture thereof, stirring the reactants for 4-6 hours and extracting the upper molten liquid to obtain a sodium cryolite; and Step B: mixing the obtained potassium cryolite with the obtained sodium cryolite in a molar ratio of 1:1 to 1:3.

Preferably, the method includes the following steps:

Step A: placing aluminum in a reactor, vacuumizing the reactor and feeding an inert gas, heating the reactor to 700-850 degrees centigrade, adding a mixture consisting of potassium fluoborate and potassium fluozirconate in a molar ratio of 2:1, stirring the reactants for 4-6 hours and extracting the upper molten liquid to obtain a potassium cryolite the molecular formula of which is $$\frac{6}{5}\text{KF}\cdot\text{AlF}_3;$$

and adding a mixture consisting of sodium fluoborate and sodium hexafluorozirconate in a molar ratio of 2:1 into the reactor, stirring the reactants for 4-6 hours and extracting the upper molten liquid to obtain a sodium cryolite the molecular formula of which is $$\frac{6}{5}\text{NaF}\cdot\text{AlF}_3;$$

and

Step B: mixing the obtained potassium cryolite $$\frac{6}{5}\text{KF}\cdot\text{AlF}_3$$

with the obtained sodium cryolite $$\frac{6}{5}\text{NaF}\cdot\text{AlF}_3$$

in a molar ratio of 1:1 to 1:3.

Preferably, the method includes the following steps:

Step A: placing aluminum in a reactor, vacuumizing the reactor and feeding an inert gas, heating the reactor to 780-850 degrees centigrade, adding potassium fluozirconate, stirring the reactants for 4-6 hours and extracting the upper molten liquid to obtain a potassium cryolite the molecular formula of which is

and placing aluminum in another reactor, vacuumizing the reactor and feeding an inert gas, heating the reactor to 780-850 degrees centigrade, adding sodium hexafluorozirconate, stirring the reactants for 4-6 hours and extracting the upper molten liquid to obtain a sodium cryolite the molecular formula of which is

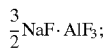

and
Step B: mixing the obtained potassium cryolite

with the obtained sodium cryolite

in a molar ratio of 1:1 to 1:3.

Preferably, the method includes the following steps:
Step A: placing aluminum in a reactor, vacuumizing the reactor and feeding an inert gas, heating the reactor to 700-850 degrees centigrade, adding a mixture consisting of potassium fluoborate and potassium fluozirconate in a molar ratio of 2:1, stirring the reactants for 4-6 hours and extracting the upper molten liquid to obtain a potassium cryolite the molecular formula of which is

and placing aluminum in another reactor, vacuumizing the reactor and feeding an inert gas, heating the reactor to 780-850 degrees centigrade, adding sodium hexafluorozirconate, stirring the reactants for 4-6 hours and extracting the upper molten liquid to obtain a sodium cryolite the molecular formula of which is

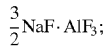

and
Step B: mixing the obtained potassium cryolite

with the obtained sodium cryolite

in a molar ratio of 1:1 to 1:3.

Preferably, the method includes the following steps:
Step A: placing aluminum in a reactor, vacuumizing the reactor and feeding an inert gas, heating the reactor to 780-850 degrees centigrade, adding potassium fluozirconate, stirring the reactants for 4-6 hours and extracting the upper molten liquid to obtain a potassium cryolite the molecular formula of which is

and placing aluminum in another reactor, vacuumizing the reactor and feeding an inert gas, adding a mixture consisting of sodium fluoborate and sodium hexafluorozirconate in a molar ratio of 2:1, stirring the reactants for 4-6 hours and extracting the upper molten liquid to obtain a sodium cryolite the molecular formula of which is

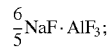

and
Step B: mixing the obtained potassium cryolite

with the obtained sodium cryolite

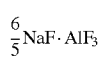

in a molar ratio of 1:1 to 1:3.

After the electrolyte prepared using the technical scheme provided herein is used in the aluminum electrolysis industry, the solubility property of alumina is improved, and consequentially, the electrolysis temperature, the power consumption and the volatilization loss of fluoride are lowered while the electrolysis efficiency is improved, thus reducing the overall production cost.

Compared with existing technologies, the disclosure has the following beneficial effects: when used in the aluminum electrolysis industry, the electrolyte system provided herein can be directly used as an aluminum electrolyte or a replenishment system in an electrolyte; the electrolysis temperature during an aluminum electrolysis process can be obviously reduced without changing existing electrolysis technologies, thus reducing the power consumption, the volatilization loss of fluoride and the overall production cost; besides, the preparation method provided herein requiring a mild reaction condition is easy to control, simple in technical flow and capable of reacting reactants completely to prepare a product of high quality.

DETAILED DESCRIPTION OF THE PREFERRED EMBODIMENTS

The disclosure is described below in detail with reference to specific embodiments.

Embodiment 1

One ton of aluminum is weighed and placed in a reactor, the reactor is vacuumized and fed with argon for protection and then heated to 800 degrees centigrade, dry potassium fluozirconate is slowly added into the reactor in a reactive proportion, the reactants are rapidly stirred for 5 hours to generate zirconium sponge and a potassium cryolite

then the cover of the reactor is opened, the upper molten liquid potassium cryolite

is pumped out using a siphon pump.

The electrolyte

generated during the aluminum electrolysis process is added into the continuously consumed fundamental system of the electrolyte to obviously reduce the electrolysis temperature, finally reducing the electrolysis temperature to 820 to 850 degrees centigrade. As the potassium cryolite

is more corrosive than trisodium hexafluoroaluminate, an electrolytic bath needs to have an inactive anode or an anode subjected to an inactive surface processing so as to be prolonged in service life.

Embodiment 2

One ton of aluminum is weighed and placed in a reactor, the reactor is vacuumized and fed with argon for protection and then heated to 800 degrees centigrade, dry sodium hexafluorozirconate is slowly added into the reactor in a reactive proportion, the reactants are rapidly stirred for 5 hours to generate zirconium sponge and a sodium cryolite

then the cover of the reactor is opened, the upper molten liquid sodium cryolite

is pumped out using a siphon pump.

The electrolyte

generated during the aluminum electrolysis process is added into the continuously consumed fundamental system of the electrolyte to obviously reduce the electrolysis temperature, finally reducing the electrolysis temperature to 820 to 850 degrees centigrade. As the sodium cryolite

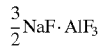

is more corrosive than trisodium hexafluoroaluminate, an electrolytic bath needs to have an inactive anode or an anode subjected to an inactive surface processing so as to be prolonged in service life.

Embodiment 3

One ton of aluminum is weighed and placed in a reactor, the reactor is vacuumized and fed with argon for protection and then heated to 750 degrees centigrade, a dry mixture consisting of potassium fluoborate and potassium fluozirconate in a molar ratio of 2:1 is slowly added into the reactor in a reactive proportion, the reactants are rapidly stirred for 5 hours to generate zirconium boride and a potassium cryolite

then the cover of the reactor is opened, the upper molten liquid potassium cryolite

is pumped out using a siphon pump.

The electrolyte

generated during the aluminum electrolysis process is added into the continuously consumed fundamental system of the electrolyte to obviously reduce the electrolysis temperature, finally reducing the electrolysis temperature to 900 to 930 degrees centigrade.

Embodiment 3

One ton of aluminum is weighed and placed in a reactor, the reactor is vacuumized and fed with argon for protection and then heated to 750 degrees centigrade, a dry mixture consisting of sodium fluoborate and sodium hexafluorozirconate in a molar ratio of 2:1 is slowly added into the reactor in a reactive proportion, the reactants are rapidly stirred for 5 hours to generate zirconium boride and a sodium cryolite

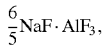

then the cover of the reactor is opened, the upper molten liquid sodium cryolite

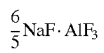

is pumped out using a siphon pump.

The electrolyte replenishment system

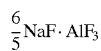

generated during the aluminum electrolysis process is added into the continuously consumed fundamental system of the electrolyte to obviously reduce the electrolysis temperature, finally reducing the electrolysis temperature to 900 to 930 degrees centigrade.

Embodiment 4

One ton of aluminum is weighed and placed in a reactor, the reactor is vacuumized and fed with argon for protection and then heated to 750 degrees centigrade, a dry mixture consisting of potassium fluoborate and potassium fluozirconate in a molar ratio of 2:1 is slowly added into the reactor in a reactive proportion, the reactants are rapidly stirred for 5 hours to generate zirconium boride and a potassium cryolite

then the cover of the reactor is opened, the upper molten liquid potassium cryolite is pumped out using a siphon pump. One ton of aluminum is placed in another reactor, the reactor is vacuumized and fed with argon for protection and then heated to 750 degrees centigrade, a dry mixture consisting of sodium fluoborate and sodium hexafluorozirconate in a molar ratio of 2:1 is slowly added into the reactor in a reactive proportion, the reactants are rapidly stirred for 5 hours to generate zirconium boride and a sodium cryolite

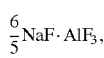

then the cover of the reactor is opened, the upper molten liquid sodium cryolite is pumped out using a siphon pump.

A cryolite mixture obtained by mixing the prepared potassium cryolite

with the prepared sodium cryolite

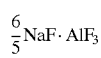

in a molar ratio of 1:1 is directly added into an electrolytic bath, an electrolysis process is conducted using an inert electrode material or a carbon electrode material or a mixed electrode material (the combined use of carbon and an inert material) at a controlled working electrolysis temperature of 825-900 degrees centigrade, then a virgin aluminum is obtained.

Embodiment 5

One ton of aluminum is weighed and placed in a reactor, the reactor is vacuumized and fed with argon for protection and then heated to 800 degrees centigrade, dry potassium fluozirconate is slowly added into the reactor in a reactive proportion, the reactants are rapidly stirred for 5 hours to generate zirconium sponge and a potassium cryolite

then the cover of the reactor is opened, the upper molten liquid potassium cryolite is pumped out using a siphon pump. One ton of aluminum is weighed and placed in another reactor, the reactor is vacuumized and fed with argon for protection and then heated to 800 degrees centigrade, dry sodium hexafluorozirconate is slowly added into the reactor in a reactive proportion, the reactants are rapidly stirred for 5 hours to generate zirconium sponge and a sodium cryolite

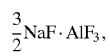

then the cover of the reactor is opened, the upper molten liquid sodium cryolite is pumped out using a siphon pump.

A cryolite mixture obtained by mixing the prepared potassium cryolite

with the prepared sodium cryolite

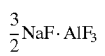

in a molar ratio of 1:2 is directly used as the replenishment system in an electrolyte, an electrolysis process is conducted using an inert electrode material or a carbon electrode material or a mixed electrode material (the combined use of carbon and an inert material) at a controlled working electrolysis temperature of 850-900 degrees centigrade, then a virgin aluminum is obtained.

Embodiment 6

One ton of aluminum is weighed and placed in a reactor, the reactor is vacuumized and fed with argon for protection and then heated to 750 degrees centigrade, a dry mixture consisting of potassium fluoborate and potassium fluozirconate in a molar ratio of 2:1 is slowly added into the reactor in a reactive proportion, the reactants are rapidly stirred for 5 hours to generate zirconium boride and a potassium cryolite

then the cover of the reactor is opened, the upper molten liquid potassium cryolite is pumped out using a siphon pump. One ton of aluminum is weighed and placed in another reactor, the reactor is vacuumized and fed with argon for protection and then heated to 800 degrees centigrade, dry sodium hexafluorozirconate is slowly added into the reactor in a reactive proportion, the reactants are rapidly stirred for 5 hours to generate zirconium sponge and a sodium cryolite

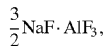

then the cover of the reactor is opened, the upper molten liquid sodium cryolite is pumped out using a siphon pump.

A cryolite mixture obtained by mixing the prepared potassium cryolite

with the prepared sodium cryolite

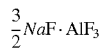

in a molar ratio of 1:3 is directly used as an electrolyte system, the working range of the electrolysis temperature is controlled from 850-900 degrees centigrade, an electrolysis process is conducted using an inert electrode material or a carbon electrode material or a mixed electrode material (the combined use of carbon and an inert material) at a controlled working electrolysis temperature of 850-900 degrees centigrade, then a virgin aluminum is obtained.

Embodiment 7

One ton of aluminum is weighed and placed in a reactor, the reactor is vacuumized and fed with argon for protection and then heated to 800 degrees centigrade, dry potassium fluozirconate is slowly added into the reactor in a reactive proportion, the reactants are rapidly stirred for 5 hours to generate zirconium sponge and a potassium cryolite

then the cover of the reactor is opened, the upper molten liquid potassium cryolite is pumped out using a siphon pump. One ton of aluminum is placed in another reactor, the reactor is vacuumized and fed with argon for protection and then heated to 750 degrees centigrade, a dry mixture consisting of sodium fluoborate and sodium hexafluorozirconate in a molar ratio of 2:1 is slowly added into the reactor in a reactive proportion, the reactants are rapidly stirred for 5 hours to generate zirconium boride and a sodium cryolite

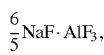

then the cover of the reactor is opened, the upper molten liquid sodium cryolite is pumped out using a siphon pump.

A cryolite mixture obtained by mixing the prepared potassium cryolite

with the prepared sodium cryolite

in a molar ratio of 1:1 is directly used as the replenishment system in an electrolyte, an electrolysis process is conducted using an inert electrode material or a carbon electrode material or a mixed electrode material (the combined use of carbon and an inert material) at a controlled working electrolysis temperature of 850-900 degrees centigrade, then a virgin aluminum is obtained.

The above is detailed description of the disclosure with reference to specific preferred embodiments which is not to be construed as limiting the disclosure. The various simple deductions or replacements that can be devised by those of ordinary skill in the art without departing from the concept of the disclosure all fall within the protection scope of the disclosure.

What is claimed is:

1. A method for preparing an electrolyte comprising the following steps of:
   Step A: placing aluminum in a reactor, vacuumizing the reactor and feeding an inert gas, heating the reactor to 700-850 degrees centigrade, and adding only potassium fluozirconate; and
   Step B: stirring for 4-6 hours and extracting an upper molten liquid to obtain only zirconium sponge and an

electrolyte according to a reaction formula of

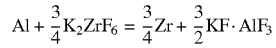

so as to replenish the

electrolyte during an electrolytic process.

2. A method for preparing an electrolyte during an electrolytic process, including the steps of:
   Step A: placing aluminum in a first reactor, vacuumizing the first reactor and feeding inert gas, heating the first reactor to 700-850 degrees centigrade, adding only a first reactant of potassium fluozirconate, stirring 4-6 hours and extracting a first upper molten liquid to obtain only zirconium sponge and a potassium AlF$_3$ cryolite; and placing aluminum in a second reactor, vacuumizing the second reactor and feeding inert gas, heating the second reactor to 700-850 degrees centigrade, adding only a second reactant of sodium hexafluorozirconate, stirring for 4-6 hours and extracting a second upper molten liquid to obtain only zirconium sponge and a sodium $AlF_3$ cryolite; and Step B: mixing the obtained potassium cryolite with the obtained sodium cryolite in a molar ratio of 1:1 to 1:3.

3. The method for preparing an electrolyte during an electrolytic process according to claim 2, comprising the steps of:

in said Step A: extracting the first upper molten liquid to obtain the potassium cryolite the molecular formula of which is

and extracting the second upper molten liquid to obtain the sodium cryolite the molecular formula of which is

and in said Step B: mixing the obtained potassium cryolite

with the obtained sodium cryolite

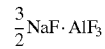

in a molar ratio of 1:1 to 1:3.

4. A method for preparing an electrolyte comprising the steps of:

Step A: placing aluminum in a reactor, vacuumizing the reactor and feeding an inert gas, heating the reactor to 700-850 degrees centigrade, and adding only sodium hexafluorozirconate; and Step B: stirring for 4-6 hours and extracting an upper molten liquid to obtain only zirconium sponge and an

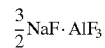

electrolyte during an aluminum electrolysis process according to a reaction formula of

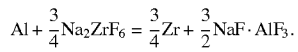

* * * * *